US008700709B2

(12) United States Patent
Axelrod et al.

(10) Patent No.: US 8,700,709 B2
(45) Date of Patent: Apr. 15, 2014

(54) CONDITIONAL LOCATION-BASED REMINDERS

(75) Inventors: Elinor Axelrod, Tel Aviv (IL); Hen Fitoussi, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 13/193,636

(22) Filed: Jul. 29, 2011

(65) Prior Publication Data

US 2013/0031169 A1    Jan. 31, 2013

(51) Int. Cl.
*G06F 15/16* (2006.01)

(52) U.S. Cl.
USPC .......................................... 709/204

(58) Field of Classification Search
USPC .......................................... 709/204
See application file for complete search history.

(56) References Cited

U.S. PATENT DOCUMENTS

| | | | |
|---|---|---|---|
| 6,665,613 B2 | 12/2003 | Duvall | |
| 6,721,652 B1 | 4/2004 | Sanqunetti | |
| 7,016,855 B2 | 3/2006 | Eaton et al. | |
| 7,394,405 B2 | 7/2008 | Godden | |
| 7,577,522 B2 | 8/2009 | Rosenberg | |
| 7,649,454 B2 | 1/2010 | Singh et al. | |
| 7,848,765 B2 | 12/2010 | Phillips et al. | |
| 8,054,180 B1 * | 11/2011 | Scofield et al. | 340/539.13 |
| 8,471,701 B2 | 6/2013 | Yariv et al. | |
| 8,537,003 B2 | 9/2013 | Khachaturov et al. | |
| 2004/0024846 A1 | 2/2004 | Randall et al. | |
| 2004/0171379 A1 | 9/2004 | Cabrera et al. | |
| 2004/0230685 A1 | 11/2004 | Seligmann | |
| 2005/0159883 A1 | 7/2005 | Humphries et al. | |
| 2006/0161599 A1 | 7/2006 | Rosen | |
| 2006/0200305 A1 | 9/2006 | Sheha et al. | |
| 2006/0224319 A1 | 10/2006 | Rogers | |
| 2006/0235890 A1 | 10/2006 | Vigil | |
| 2006/0270421 A1 | 11/2006 | Phillips et al. | |
| 2007/0123220 A1 | 5/2007 | Weiser et al. | |
| 2007/0176771 A1 | 8/2007 | Doyle | |
| 2007/0185785 A1 | 8/2007 | Carlson et al. | |
| 2007/0264969 A1 | 11/2007 | Frank et al. | |
| 2008/0014908 A1 | 1/2008 | Vasant | |
| 2008/0014964 A1 | 1/2008 | Sudit et al. | |
| 2008/0021637 A1 | 1/2008 | Staton et al. | |
| 2008/0114638 A1 | 5/2008 | Colliau et al. | |
| 2008/0125965 A1 | 5/2008 | Carani et al. | |
| 2008/0208615 A1 | 8/2008 | Banavar et al. | |

(Continued)

OTHER PUBLICATIONS

Lackey, Stephen, "Integrating Place and Time with Tasks: Adding Transportation to PIM", Retrieved at <<http://pimworkshop.org/2009/papers/lackey-pim2009.pdf>>, Nov. 7-8, 2009.

(Continued)

*Primary Examiner* — David X Yi
(74) *Attorney, Agent, or Firm* — Steven Spellman; Jim Ross; Micky Minhas (57) ABSTRACT

Architecture that enables conditional location-based notifications. One or multiple factors (filter criteria) can be considered, and triggering of a notification can be based on some or all of the factors. Those factors can be static (e.g., time based) or dynamic (e.g., a previous user location) and extend the ability to filter unnecessary notifications, and thus, increase user satisfaction. The filter criteria can include checking user back balance, and calendar as prerequisites to sending a notification.

9 Claims, 10 Drawing Sheets

(56) References Cited

U.S. PATENT DOCUMENTS

| | | | |
|---|---|---|---|
| 2008/0270224 A1 | 10/2008 | Portman et al. | |
| 2009/0017811 A1 | 1/2009 | Cole et al. | |
| 2009/0191895 A1 | 7/2009 | Singh et al. | |
| 2009/0307105 A1 | 12/2009 | Lemay et al. | |
| 2010/0042470 A1 | 2/2010 | Chang et al. | |
| 2010/0093371 A1 | 4/2010 | Gehrke et al. | |
| 2010/0222081 A1 | 9/2010 | Ward et al. | |
| 2010/0250131 A1 | 9/2010 | Relyea et al. | |
| 2010/0253508 A1 | 10/2010 | Koen et al. | |
| 2010/0291950 A1* | 11/2010 | Lin et al. | 455/456.3 |
| 2010/0292827 A1 | 11/2010 | Sievenpiper et al. | |
| 2010/0295676 A1* | 11/2010 | Khachaturov et al. | 340/540 |
| 2010/0312838 A1 | 12/2010 | Lyon et al. | |
| 2010/0331016 A1 | 12/2010 | Dutton et al. | |
| 2011/0001638 A1 | 1/2011 | Pudar | |
| 2011/0238476 A1* | 9/2011 | Carr et al. | 705/14.25 |
| 2012/0088487 A1 | 4/2012 | Khan | |
| 2012/0095979 A1 | 4/2012 | Aftab et al. | |
| 2013/0042295 A1 | 2/2013 | Kelly et al. | |

OTHER PUBLICATIONS

Lehikoinen, et al., "PePe Field Study: Constructing Meanings for Locations in the Context of Mobile Presence", Retrieved at <<http://luci.ics.uci.edu/websiteContent/weAreLuci/biographies/faculty/djp3/LocalCopy/p53-lehikoinen.pdf>>, Proceedings of the 8th conference on Human-computer interaction with mobile devices and services, Sep. 12-15, 2006.

Ferscha, et al., "Context Awareness for Group Interaction Support", Retrieved at <<http://citeseerx.ist.psu.edu/viewdoc/download-?doi=10.1.1.61.5223&rep=rep1&type=pdf>>, Proceedings of the second international workshop on Mobility management & wireless access protocols, Oct. 1, 2004.

"Geographic Reminders", U.S. Appl. No. 12/468,874, filed May 20, 2009.

"Delayed and Time-Space Bound Mobile Notifications", U.S. Appl. No. 13/110,001, filed May 18, 2011.

"Reverse Reminders", U.S. Appl. No. 13/118,481, filed May 30, 2011.

"Location-Based Promotion of Applications", U.S. Appl. No. 13/211,322, filed May 30, 2011.

"Adaptation of Notification Perimeter Based on Relevance to a User", U.S. Appl. No. 13/118,490, filed Dec. 6, 2012.

Bareth, et al., "geoXmart—A Marketplace for Geofence-Based Mobile Services". Retrieved at <<http://ieeexplore.ieee.org/stamp/stamp.jsp?tp=&arnumber=5676340>>. Proceedings of the 34th Annual IEEE International Computer Software and Applications Conference, Jul. 19-23, 2010.

Demiryurek, et al., "TransDec: A Spatiotemporal Query Processing Framework for Transportation Systems", Retrieved at <<http://ieeexplore.iee.org/stamp/stamp.jsp?tp=&arnumber=5447745>>, IEEE 26th International Conference on Data Engineering (ICDE), Mar. 1-6, 2010.

Resch, et al., "Live Geography—Embedded Sensing for Standardised Urban Environmental Monitoring", Retrieved at <<http://senseable.mit.edu/papers/pdf/2009_Resch_et_al_ASM_urban_environmental_monitoring.pdf>>, International Journal on Advances in Systems and Measurements, Dec. 1, 2009.

Shutzer, Dan, "Location-based Service", Retrived at <<http://www.bits.org/downloads/Publications%20/Page/CTOCornerAugust2010.pdf>>, Aug. 2010.

Schilit, et al., "Customizing Mobile Applications", Retrieved at <<http://citeseerx.ist.psu.edu/viewdoc/download?doi=10.1.1.31.2550&rep=rep1&type=pdf>>, In Proceedings in the USENIX Symposium on Mobile & Location-Independent Computing,1993.

"Market Filters", Retrieved at <<http://developer.android.com/guide/appendix/market-filters.html>>, Retrieved Date: Apr. 7, 2011.

"Location-based event system for mobile phones", Retrieved at <<http://janmagnet.files.wordpress.com/2008/01/locationbasedeventsystem.pdf>>, Retrieved Date: Apr. 7, 2011.

International Search Report from Korean Intellectual Property Office mailed Jan. 30, 2013 in copending application No. PCT/US2012/049676, filed Aug. 5. 2012, pp. 1-10.

Sameed, "Set Location-Based Reminder on Android With Geo Reminders", Retrieved at <<http://www.addictivetips.com/mobile/set-location-based reminders-on-android-with-geo-reminders/>>, Mar. 8, 2011.

Murfitt, Dan, "Located based reminders", Retrieved at <<http://murfitt.net/blog/dan/2010/01/07location-based-reminders>>, Jul. 1, 2010.

Samuels, Michael, "Intelligent Reminder", Retrieved at <<http://www.androidzoom.com/android_applications/productivity/intelligent-reminder_rvsl.html>>, Retrieved Date: Mar. 23, 2011.

Bareth, et al., "geoXmart—A Marketplace for Geofence-Based Mobile Services". Retrieved at <<http://ieeexplore.ieee.org/stamp/stamp.jsp?&tp=&arnumber=5676340>>. Proceedings of the 34th Annual IEEE International Computer Software and Applications Conference, Jul. 19-23, 2010.

Sameed, "Set Location-Based Reminders on Android With Geo Reminders", Retrieved at <<http://www.addictivetips.com/mobile/set-location-based reminders-on-android-with-geo-reminders/>>, Mar. 8, 2011.

* cited by examiner

CONDITIONAL LOCATION-BASED REMINDERS

CROSS-REFERENCE TO RELATED APPLICATIONS

This application is related to pending U.S. patent application Ser. No. 13/110,001 entitled "Delayed and Time-Space Bounded Notifications" and filed May 18, 2011.

BACKGROUND

Existing implementations of geographical-based reminders trigger the notification event to the user based solely on the user location. A problem is that the reminder will always get triggered upon reaching the location. Factors such as time, path, velocity, and other interesting factors are not considered when triggering the event.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables conditional location-based reminders that consider several factors, and enables triggering of a reminder based on some or all of the factors. Those factors can be static (e.g., time based) and/or dynamic (e.g., previous location) and extend the ability to filter unnecessary notifications, and thus, increase the user satisfaction.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is based on existing location-based notification infrastructures, and extends such infrastructures by applying complex constraints and personal information of the user such as calendar and bank-balance. The notifications can ultimately be generated and communicated based on several factors. These factors may be static (e.g., time based) and/or dynamic (e.g., previous location) and extend the ability to filter unnecessary notifications thereby increasing user satisfaction.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
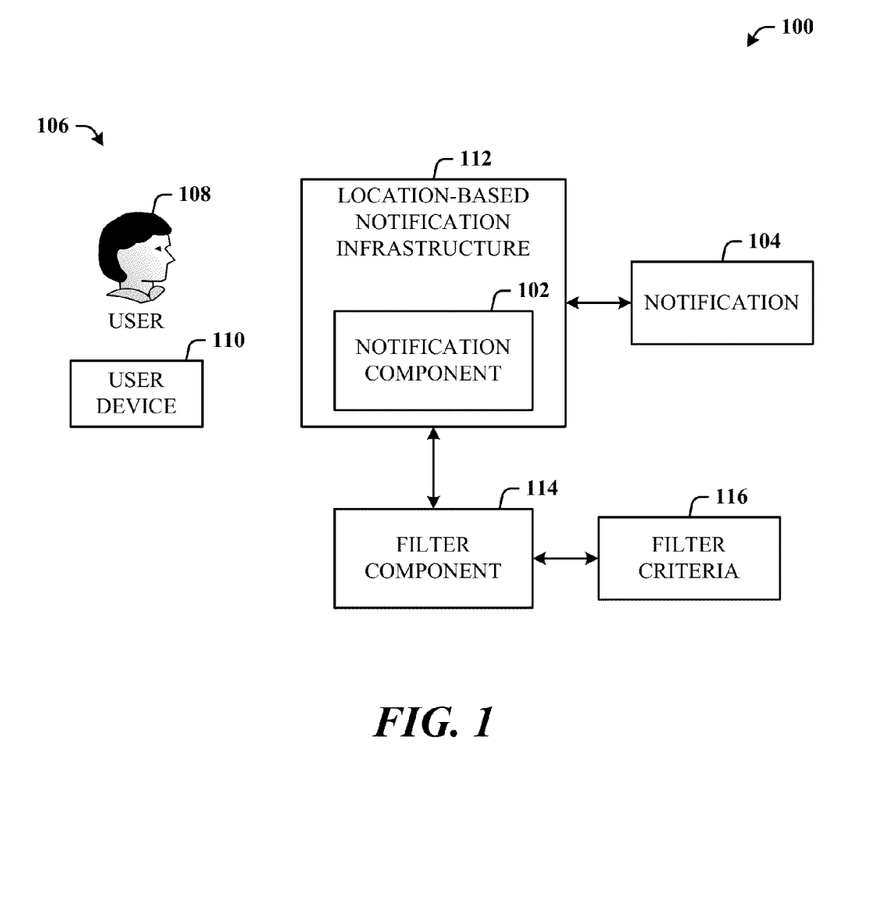
FIG. 1 illustrates a system in accordance with the disclosed architecture.

FIG. 1 illustrates a system 100 in accordance with the disclosed architecture. The system 100 includes a notification component 102 that operates to generate a notification 104 (reminder) based on geographic location 106 of a user 108 (and associated user device 110). The notification component 102 can be associated with a location-based notification infrastructure 112 such as a geo-fence.

A geo-fence is a predefined virtual perimeter (e.g., within a two mile radius) of a physical geographic area or point of interest. When the geo-location (geographic location) of a user device (e.g., mobile device) of a user matches the geo-location information (e.g., latitude-longitude coordinates) that defines the virtual perimeter, predetermined events can be triggered to occur, such as sending a notification to the user device of the user or another user device (e.g., desktop computer).

A filter component 114 of the system 100 processes filter criteria 116 to manage operation of the notification component 102 in association with the user location 106. The filter criteria 116 can include at least one of a constraint, personal information of the user, or information obtained from a website. The filter criteria 116 can include a time constraint that when processed manages generation of the notification by the notification component based on temporal information.

The filter criteria 116 can include a constraint that when processed manages generation of the notification based on a previous route traveled by the user relative to the location. The filter criteria 116 can include a constraint that when processed manages generation of the notification based on financial account information. The filter criteria can include personal information that comprises calendar-based information which allows or blocks sending of the notification based on a concurrent calendar event. The filter criteria 116 prevent the location-based notification infrastructure from generating the notification based on the filter criteria.

Following is a description of exemplary filter criteria that can be employed and examples of each.

One type of constraint is a (static) time constraint on the notification. The new notification can be configured for a specific time, multiple specific times, and/or a time range. Alternatively, the time constraint can function to block time-periods, during which the notification cannot be triggered (generated and communicated). For example, if a user sets a notification (e.g., reminder) to purchase milk at a supermarket, it is desired that the notification occur only during the operating hours of the supermarket. With respect to configuration, the time constraint filter criteria can be optional, where the user can limit the time-periods.

Another type of constraint, a (dynamic) schedule based-information (e.g., calendar) constraint takes into account the user scheduling availability when the location is reached at which the notification is to be generated and communicated. For example, if a user sets a notification in association with a business on a main travel route, and the user calendar for a certain day is set as busy (e.g., due to a team event), the notification is not triggered while travelling way to the team event.

With respect to configuration, this criterion can be configured automatically for the user when defining a new reminder, without requiring an additional operation from the user.

Yet another type of (dynamic) criteria constraint relates to the route preceding the notification associated with the user location. The new notification takes into consideration the route which has led to the notification location. For instance, the user can configure the notification only if the route originated from the user home. This can be useful in a scenario where the user plans to buy groceries and special handbags are with the user when the user leaves home.

With respect to configuration, this criterion can be optional, where the user can select whether to locate the preceding route radius (e.g., in a radius-based geo-fence). When this option is selected, the user can configure an additional location radius similar to the notification itself, for which the notification component will look up when the notification is triggered.

Still another type of (dynamic) criteria constraint relates to the financial account information such as a credit-card balance, debit card balance, bank account balance, and so on. A natural extension uses financial account balance information for triggering a location-based notification. For example, for a purchase reminder type, the user may want this notification to be valid only if the user credit-card balance is sufficient to cover the transaction.

With respect to configuration, this criterion can be optional, where the user configures the criterion to allow access to the financial account (e.g., credit card balance). When selected, the notification connects with the bank's service using the user provided account credentials. An alternative implementation can be to use the operator billing service to hold additional information such as credit card balance.

Other examples of criteria can be applied in more complex scenarios such as the following: the user has a meeting in one hour (obtained from the user calendar), yet traffic conditions (as obtained from a traffic website) indicate the user will not make the start of the meeting. The user can be notified of this based on the user location as being at home and yet to travel the distance to the meeting and particular routes. Another example criterion relates to a user who intends to travel to a destination, and to only notify the user when a given friend is also at the destination.

Figure 2:
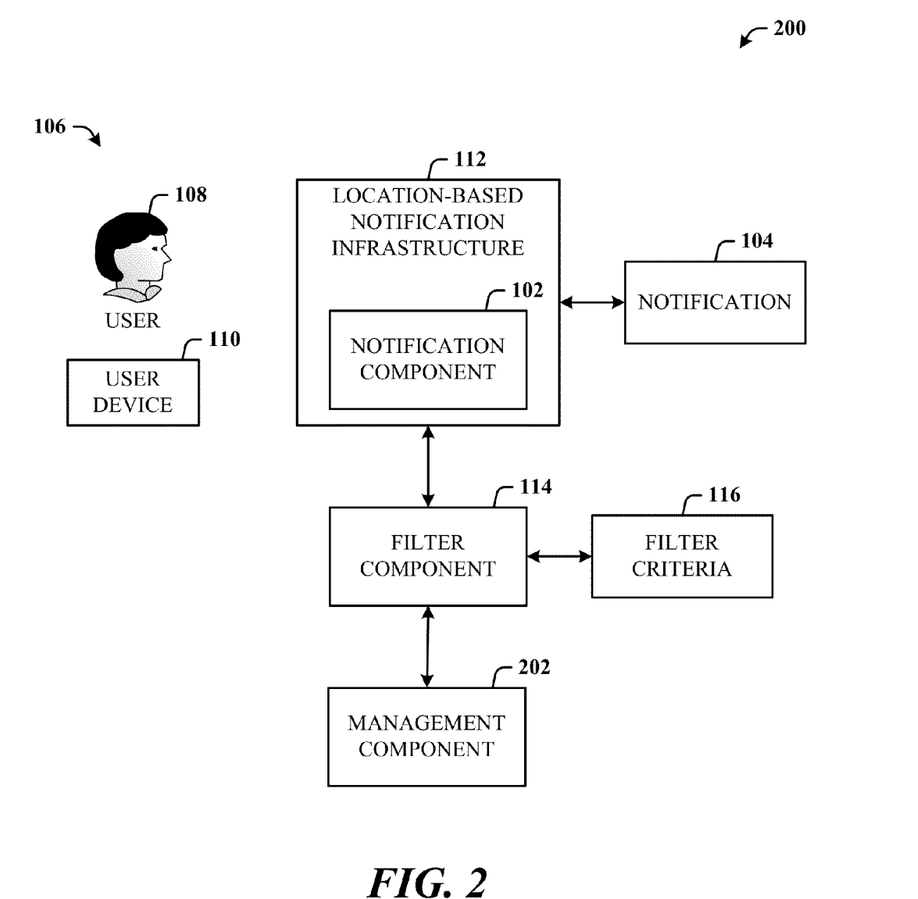
FIG. 2 illustrates an alternative embodiment of a system that further includes a management component.

FIG. 2 illustrates an alternative embodiment of a system 200 that further includes a management component 202. The system 200 includes the entities and components of the system 100 of FIG. 1 and the management component 202 that enables a user to configure the filter criteria 116. The configuration capabilities are described above as user configuration options as well as automatically invoked configurations such as the schedule-based criterion. The management component 202 enables manual and automatic configuration of the filter criteria for a given location.

Figure 3:
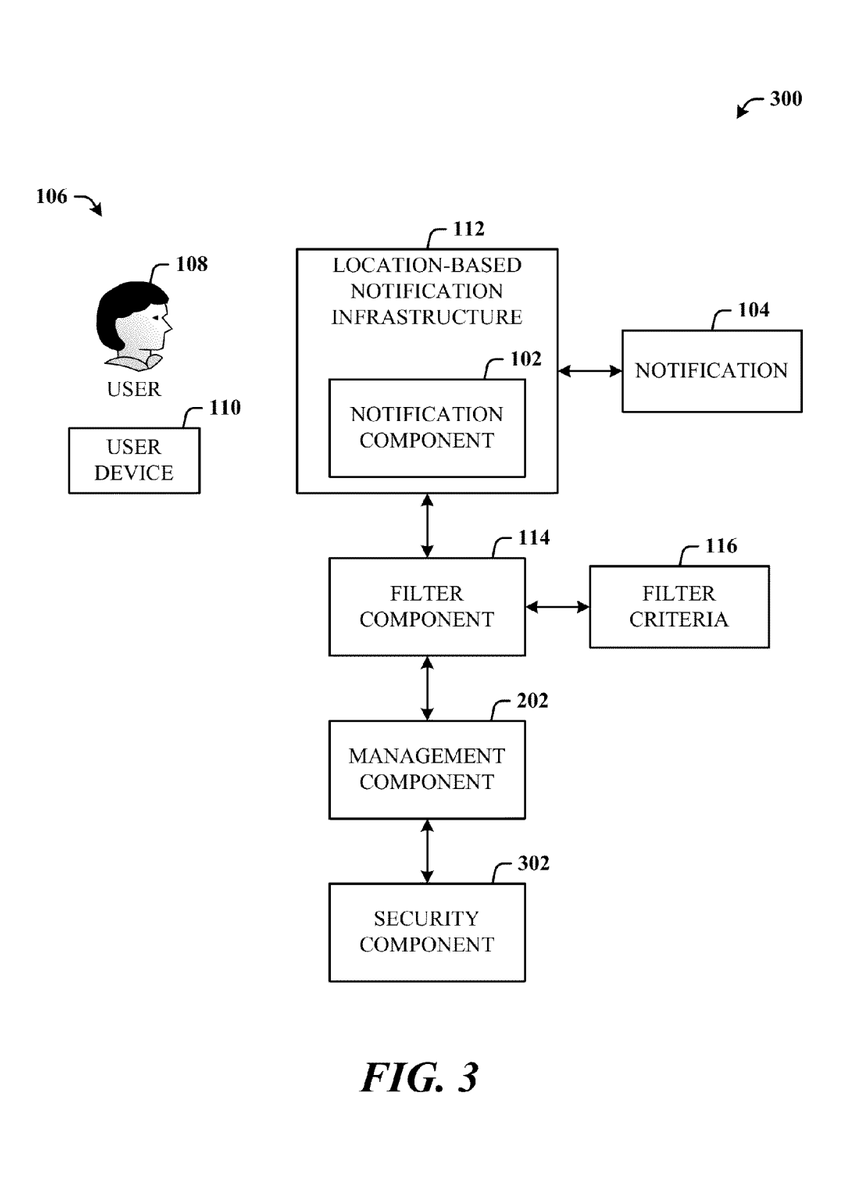
FIG. 3 illustrates a system that incorporates a security component.

It is to be understood that where user information (e.g., identifying geo-location information) is collected, the user can be provided the option to opt-in to opt-out of allowing this information to be captured and utilized. Accordingly, FIG. 3 illustrates a system 300 that incorporates a security component 302. The security component 302 can be provided to enable the user to opt-in and opt-out of identifying geolocation information as well as personal information that may have been obtained and utilized thereafter. The user can be provided with notice of the collection of information, for example, and the opportunity to provide or deny consent to do so. Consent can take several forms. Opt-in consent imposes on the user to take an affirmative action before the data is collected. Alternatively, opt-out consent imposes on the subscriber to take an affirmative action to prevent the collection of data before that data is collected. This is similar to implied consent in that by doing nothing, the user allows the data collection after having been adequately informed. The security component 302 ensures the proper collection, storage, and access to the user information while allowing for the dynamic selection and presentation of the content, features, and/or services that assist the user to obtain the benefits of a richer user experience and to access to more relevant information.

Figure 4:
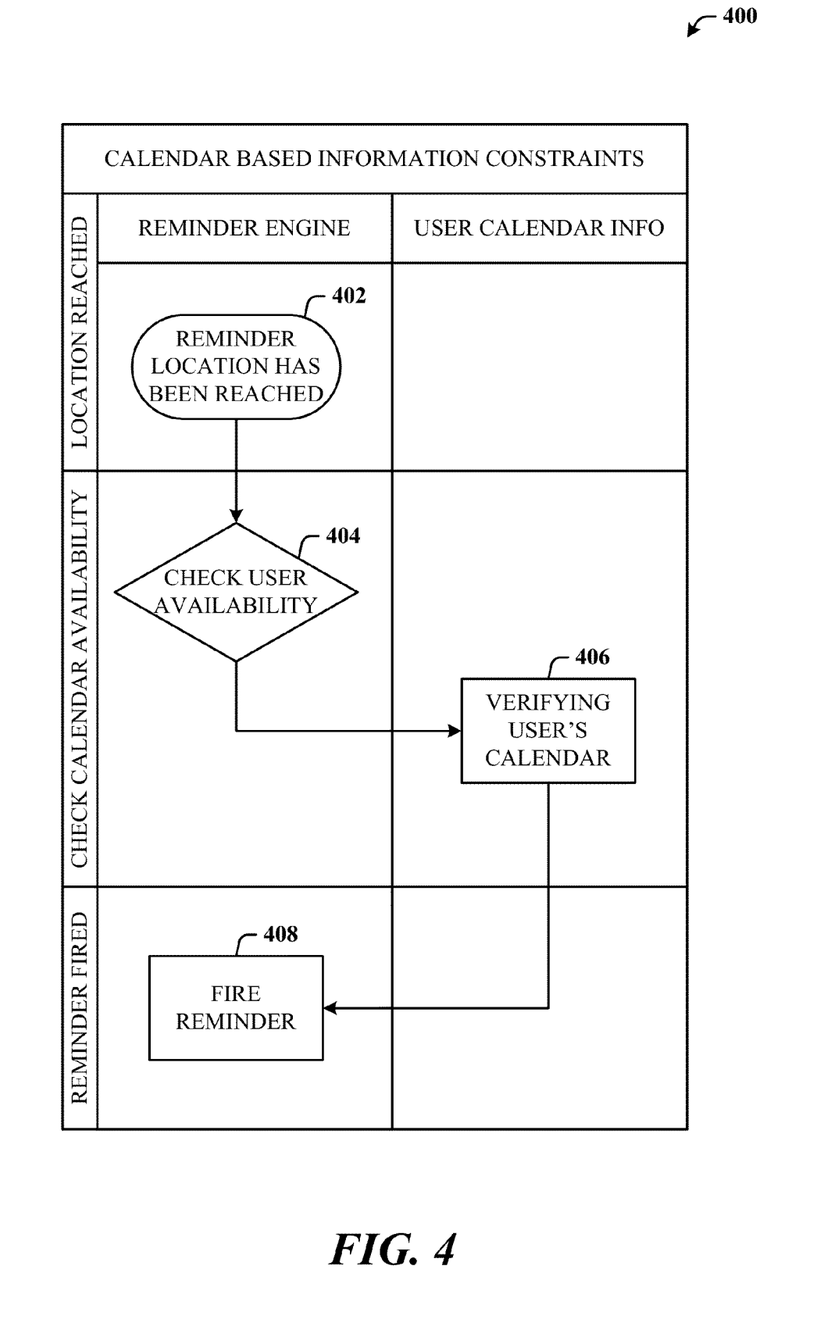
FIG. 4 illustrates a diagram that employs calendar-based information constraints.

FIG. 4 illustrates a diagram 400 that employs calendar-based information constraints. The diagram 400 shows that when the user location has been reached, at 402, as detected by a reminder engine (e.g., notification component 102), flow is in the reminder engine to then check the user calendar for user availability, as indicated at 404. At 406, user availability in the user calendar is verified based on user calendar information. Flow is then back to the reminder engine to fire the reminder (send the notification), as indicated at 408.

Figure 5:
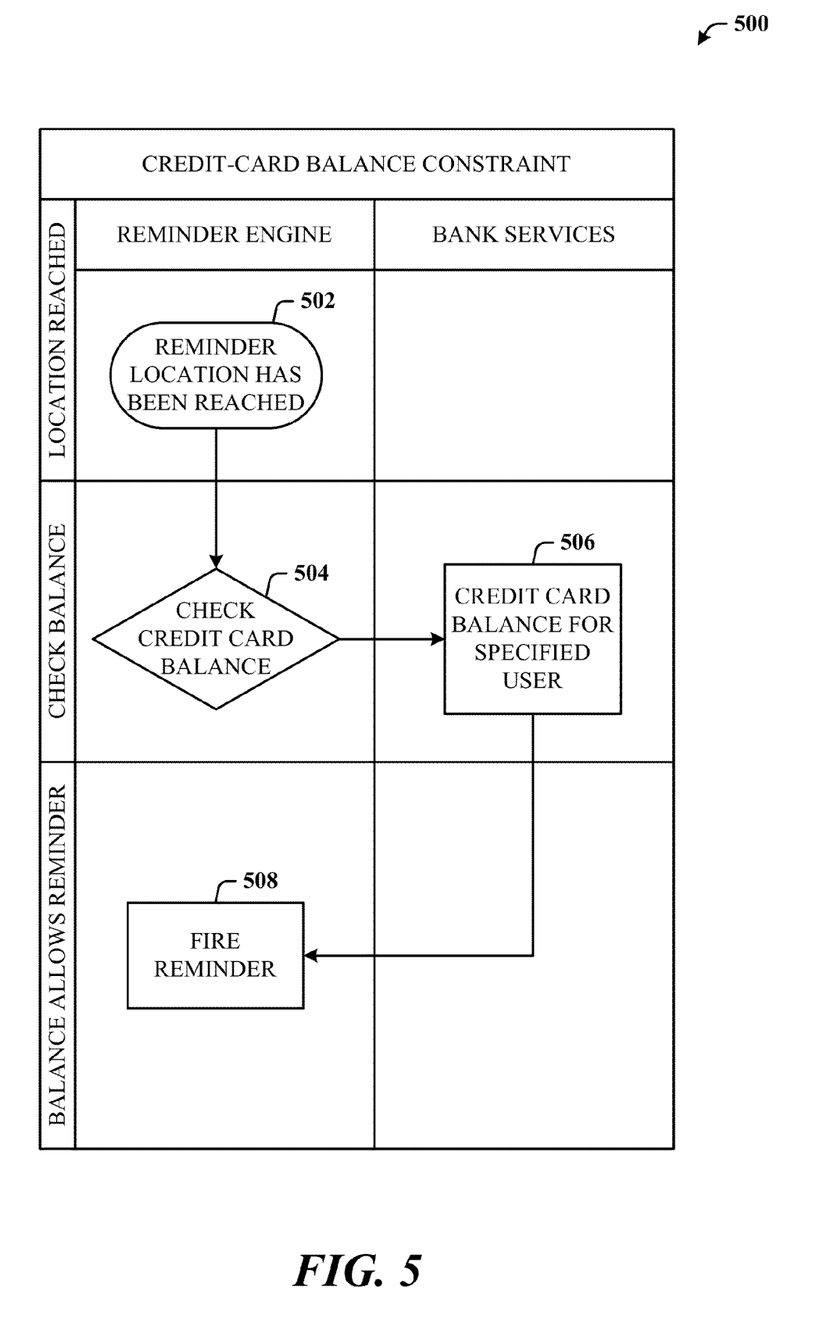
FIG. 5 illustrates a diagram that employs credit-card balance constraint.

FIG. 5 illustrates a diagram 500 that employs credit-card balance constraint. The diagram 500 shows that when the user location has been reached, at 502, as detected by a reminder engine (e.g., notification component 102), flow is in the reminder engine to then check the user credit card balance, as indicated at 504. At 506, flow is then to bank services to provide the balance information of the user. Flow is then back to the reminder engine to fire the reminder (send the notification), as indicated at 508.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
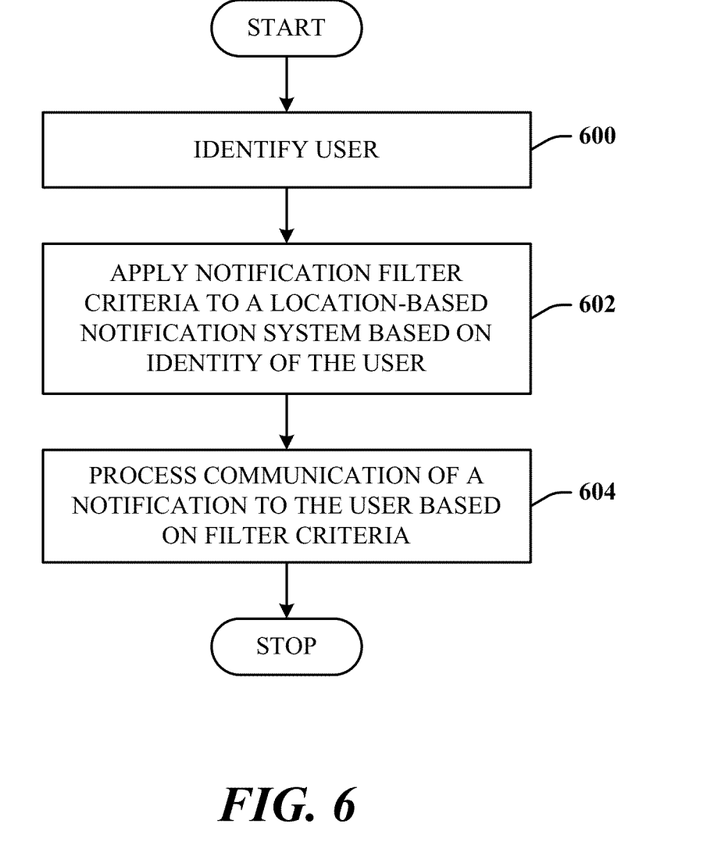
FIG. 6 illustrates a computer-implemented method in accordance with the disclosed architecture.

FIG. 6 illustrates a computer-implemented method in accordance with the disclosed architecture. At 600, a user is identified. The user can be identified based on hardware and/or software information obtained in association with a user device (e.g., mobile phone) of the user. At 602, notification filter criteria (e.g., bank account information, calendar information, etc.) is applied to a notification system (e.g., geo-fence) based on the identity of the user. At 604, communication of a notification to the user is processed based on filter criteria.

Figure 7:
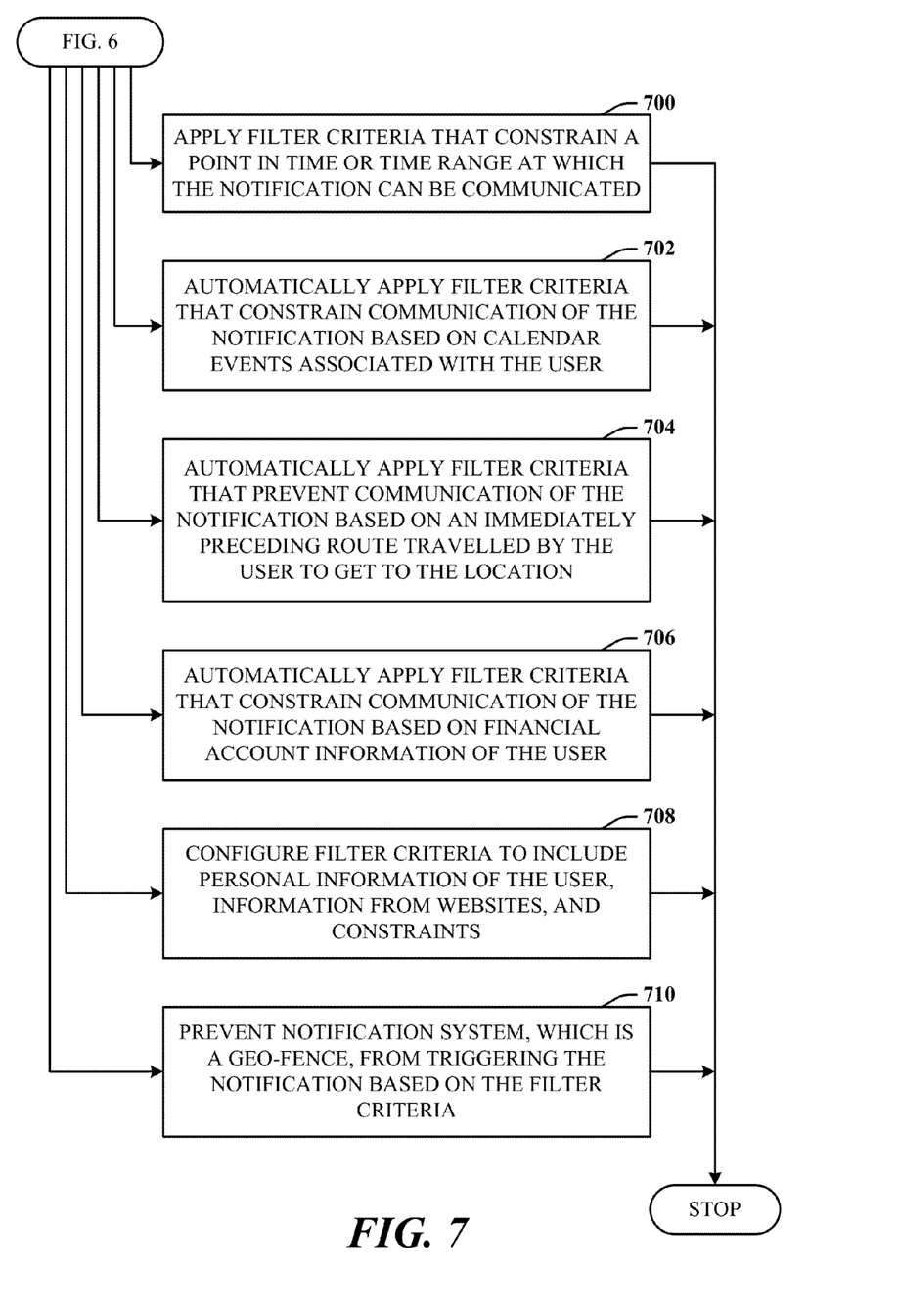
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, filter criteria that constrains a point in time or time range at which the notification can be communicated, is automatically applied. At 702, filter criteria that constrain communication of the notification based on calendar events associated with the user, is automatically applied. At 704, filter criteria that prevent communication of the notification based on an immediately preceding route traveled by the user to get to the location, is automatically applied. At 706, filter criteria that constrain communication of the notification based on financial account information of the user, is automatically applied. At 708, the filter criteria are configured to include personal information of the user, information from websites, and constraints. At 710, the notification system, which is a geo-fence, is prevented from triggering the notification based on the filter criteria.

Figure 8:
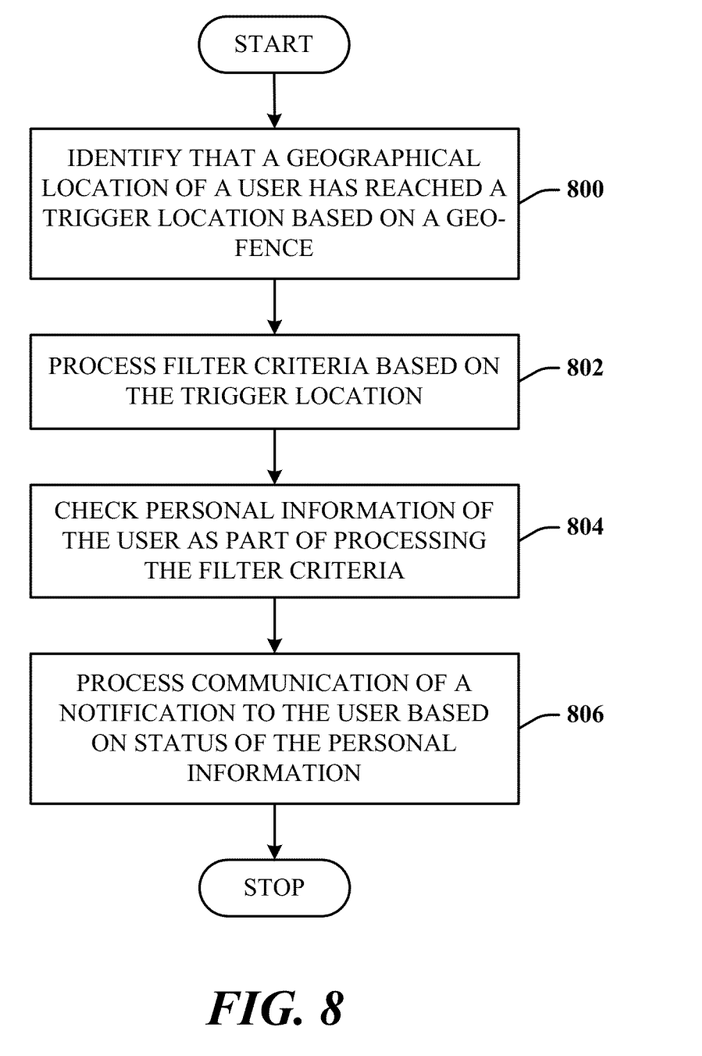
FIG. 8 illustrates an alternative method.

FIG. 8 illustrates an alternative method. At 800, it is identified that a geographical location of a user has reached a trigger location (the point at which the user location matches a perimeter value of the geo-fence) based on a geo-fence. At 802, filter criteria is processed based on the trigger location. At 804, personal information of the user is checked as part of processing the filter criteria. At 806, communication of a notification to the user is processed based on status of the personal information.

Figure 9:
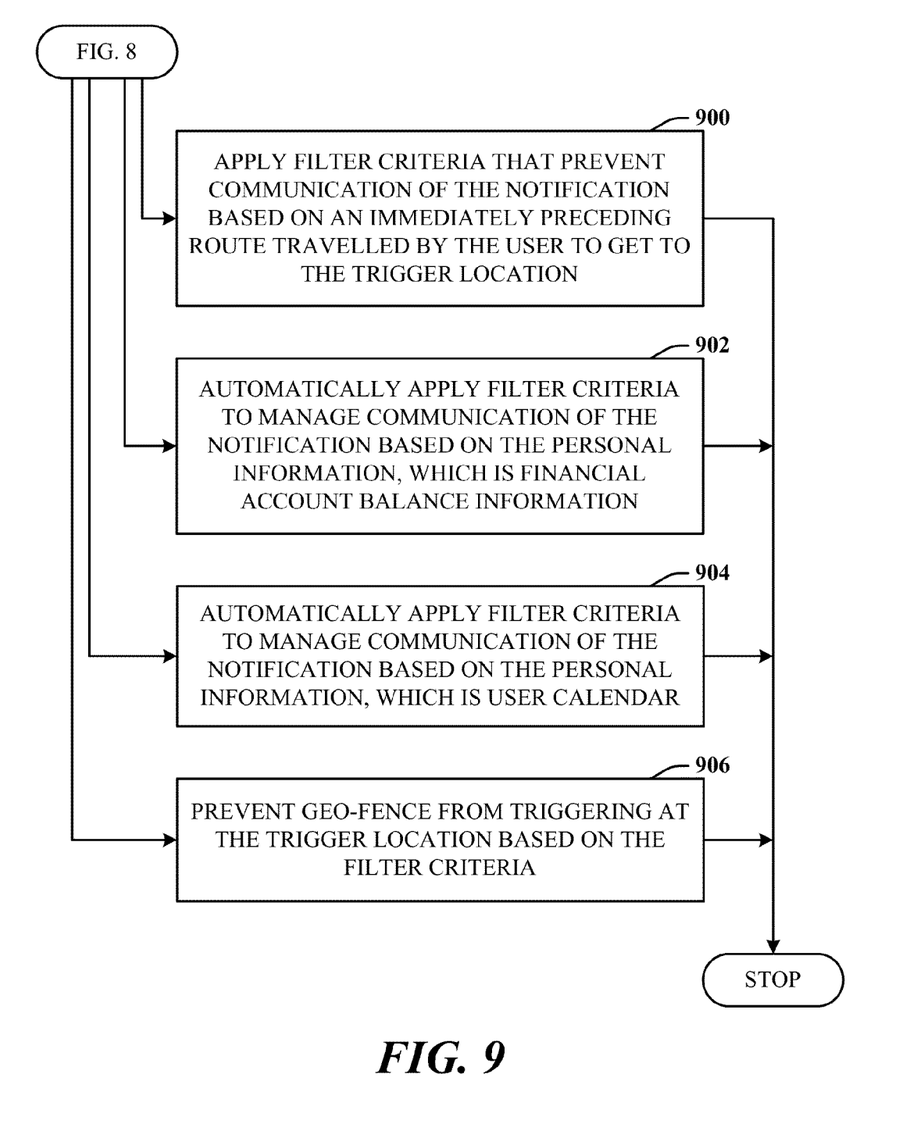
FIG. 9 illustrates further aspects of the method of FIG. 8.

FIG. 9 illustrates further aspects of the method of FIG. 8. Note that the flow indicates that each block can represent a step that can be included, separately or in combination with other blocks, as additional aspects of the method represented by the flow chart of FIG. 8. At 900, filter criteria is applied that prevent communication of the notification based on an immediately preceding route traveled by the user to get to the trigger location. At 902, filter criteria is automatically applied to manage communication of the notification based on the personal information, which is financial account balance information. At 904, filter criteria is automatically applied to manage communication of the notification based on the personal information, which is user calendar. At 906, the geo-is prevented fence from triggering at the trigger location based on the filter criteria.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
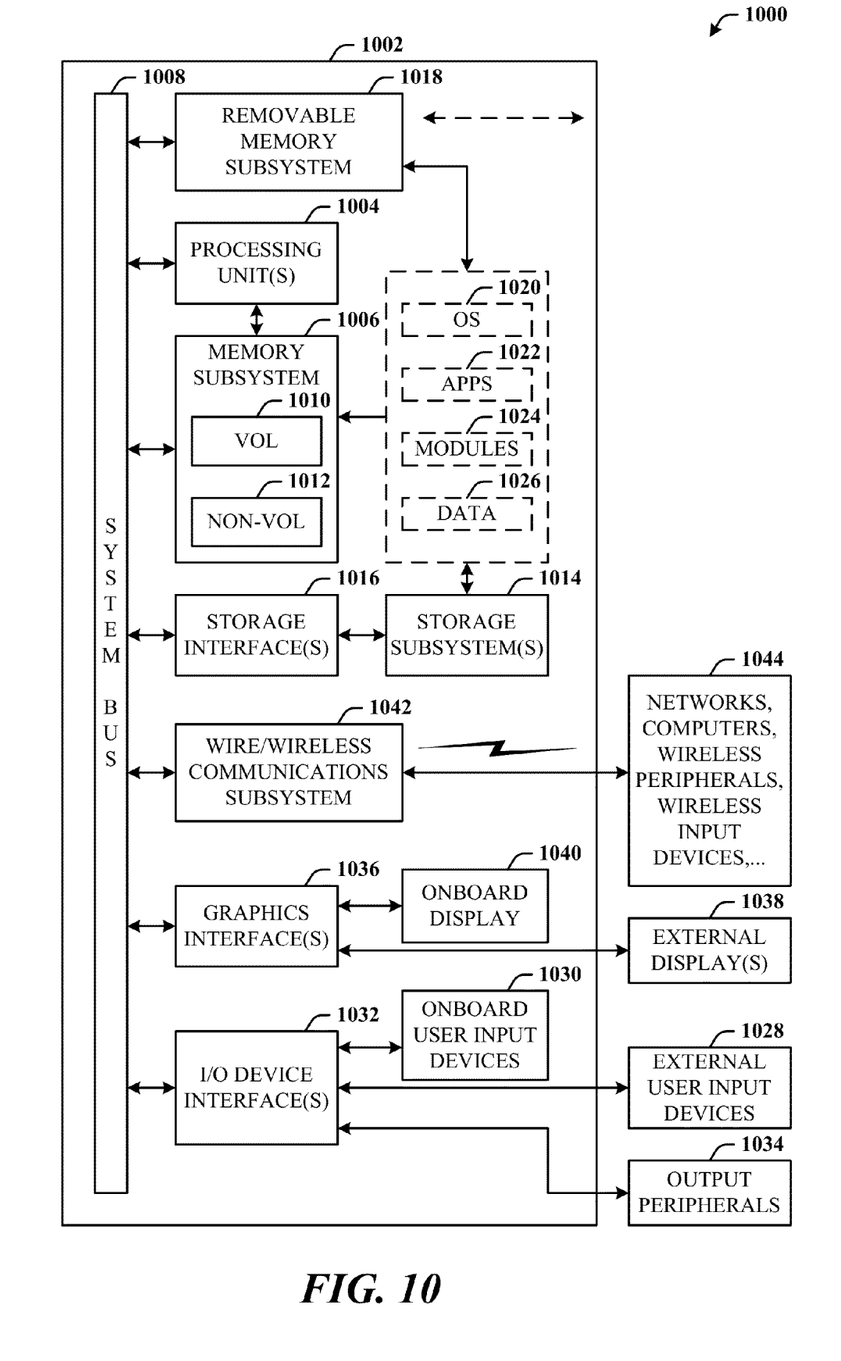
FIG. 10 illustrates a block diagram of a computing system that executes conditional-based notifications in accordance with the disclosed architecture.

Referring now to FIG. 10, there is illustrated a block diagram of a computing system 1000 that executes conditional-based notifications in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include entities and components of the system 100 of FIG. 1, entities and components of the system 200 of FIG. 2, entities and components of the system 300 of FIG. 3, entities and flow of the diagram 400 of FIG. 4, the entities and flow of the diagram 500 of FIG. 5, and the methods represented by the flowcharts of FIGS. 6-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
  a filter that processes at least one static filter criterion and at least one dynamic filter criterion, the filter criteria being unrelated to a present geographic location of a user;
  a location-based notification infrastructure for identifying that the geographical location of the user has reached a trigger location based on a geo-fence that includes a notifier that generates a notification when the geographic location of the user satisfies a location-based condition and the filter component determines that the at least one static filter criterion and the at least one dynamic filter criterion is satisfied, and automatically applies filter criteria to selectively prevent communication of the notification based on
personal information, which is financial account information or calendar-based information, and
an immediately preceding route traveled by the user to get to the location; and
a processor that executes computer-executable instructions associated with at least one of the notifier or the filter.

2. The system of claim 1, wherein the filter criteria includes at least one of a constraint, personal information of the user, or information obtained from a website.

3. The system of claim 1, wherein the filter criteria includes a time constraint that when processed manages generation of the notification by the notifier based on temporal information.

4. The system of claim 1, further comprising a manager that enables manual and automatic configuration of the filter criteria for a given location.

5. A computer-implemented method, comprising acts of:
identifying that a geographical location of a user has reached a trigger location based on a geo-fence;
applying notification filter criteria to a location-based notification system based on an identity of the user, the notification filter criteria usable to decide to selectively prevent communication of a notification;
processing communication of a generated notification to the user based on an application of route filter criteria that consider an immediately preceding route traveled by the user to get to the location and preventing communication of the notification based on a result of the application of the filter criteria; and
utilizing a processor that executes instructions stored in memory to perform at least one of the acts of identifying, applying, or processing; and
automatically applying filter criteria to manage communication of the notification based on personal information, which is financial account information or a user calendar, or
an immediately preceding route traveled by the user to get to the location.

6. The method of claim 5, further comprising applying filter criteria that constrain a point in time or time range at which the notification can be communicated.

7. The method of claim 5, further comprising configuring the filter criteria to include personal information of the user, information from websites, and constraints.

8. A computer-implemented method, comprising acts of:
identifying that a geographical location of a user has reached a trigger location based on a geo-fence;
processing filter criteria based on the trigger location;
checking personal information of the user as part of processing the filter criteria;
processing communication of a notification to the user based on status of the personal information;
selectively preventing communication of the processed notification based on a result of the application of filter criteria that considers an immediately preceding route traveled by the user to get to the trigger location;
utilizing a processor that executes instructions stored in memory to perform at least one of the acts of identifying, processing, or checking; and
automatically applying filter criteria to manage communication of the notification based on the personal information, which is financial account information or
a user calendar.

9. The method of claim 8, further comprising preventing the geo-fence from triggering at the trigger location based on the filter criteria.

* * * * *